United States Patent
Boulot

(10) Patent No.: US 6,880,394 B2
(45) Date of Patent: Apr. 19, 2005

(54) TIRE PRESSURE MONITORING SYSTEM WITH LOW CURRENT CONSUMPTION

(75) Inventor: Jean-Francis Boulot, Pont du Chateau (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 10/417,575

(22) Filed: Apr. 17, 2003

(65) Prior Publication Data

US 2003/0233872 A1 Dec. 25, 2003

(Under 37 CFR 1.47)

Related U.S. Application Data

(63) Continuation of application No. PCT/EP01/12166, filed on Oct. 22, 2001.

(30) Foreign Application Priority Data

Oct. 23, 2000 (FR) ............................................ 00 13773

(51) Int. Cl.[7] ............................................ G01M 17/02
(52) U.S. Cl. ....................................................... 73/146
(58) Field of Search ............................... 73/146, 146.2, 73/146.3, 146.5, 146.8; 340/440, 442, 447

(56) References Cited

U.S. PATENT DOCUMENTS 6,580,364 B1 * 6/2003 Munch et al. ............... 340/447
2003/0136192 A1 * 7/2003 Tu et al. ........................ 73/587

FOREIGN PATENT DOCUMENTS

DE 19917360 10/2000

* cited by examiner

Primary Examiner—Edward Lefkowitz
Assistant Examiner—Andre Allen
(74) Attorney, Agent, or Firm—E. Martin Remick

(57) ABSTRACT

A tire pressure monitoring system, comprising:
- a pressure measuring sensor in fluid communication with the ambient pressure of the tire;
- a noise detector, adapted to detect the noise produced by the vehicle when it is started;
- a management module, adapted to receive and process data supplied by the pressure sensor on the one hand and on the other hand by the noise detector such that, when the vehicle is stopped, the pressure sensor operates in "economy" mode; when the vehicle is running, the pressure sensor operates in "normal" mode.

10 Claims, 3 Drawing Sheets

Management of wheel module transmission rate
via the pressure change sensor, used as microphone

TIRE PRESSURE MONITORING SYSTEM WITH LOW CURRENT CONSUMPTION

The present application is a continuation of International Application No. PCT/EP01/12166, filed Oct. 22, 2001, published in French with an English Abstract on May 2, 2002 under PCT Article 21(2), which claims priority to French Patent Application No. FR00/13773, filed Oct. 23, 2000.

The present invention relates to a tire pressure monitoring system with low current consumption.

Car and tire manufacturers make ever greater attempts to take account of the constantly increasing demands of modern road users for safety, comfort and convenience. This phenomenon is clear from the commonplace nature of numerous types of device which were virtually non-existent barely a few years ago, such as for example airbags, ABS (anti-lock braking system) brakes, ESP (electronic stability program) devices, etc. More recently, tire pressure measuring and/or monitoring devices have become available. By informing the driver simply, reliably and regularly as to the degree of inflation of the tires of his/her vehicle, an improvement is made to safety, fuel consumption, tire service life, etc. Such systems generally comprise at least one pressure sensor of a type known per se.

Thus, certain types of pressure sensor (e.g., capacitive or resistive types) are known, for example, which allow measurement of the pressure of a tire at a given time. In general such sensors require an electrical supply to carry out measurements and transmit the information collected. It is known to equip the wheel with a battery. If it is wished to carry out frequent or even continuous pressure measurements, which is indispensable if it is desired to detect puncture of a tire for example, the battery has then to be easily replaceable, since the sensor makes considerable demands on the battery, which becomes rapidly discharged. It has to be possible to effect replacement in a simple, quick and cheap manner.

In such a context, problems of reliability are regularly encountered due to the battery's contacts, which have to withstand the most severe of environments. The contacts deteriorate and the supply of electrical energy risks becoming random or unstable, or even being broken off completely.

To remedy this type of situation, non-replaceable batteries are used, which may be incorporated in definitive manner into the electrical circuit, for example by welding. In this way, a more reliable energy supply is achieved. On the other hand, if it is wished to prevent the service life of the battery from being too short, it is highly desirable to avoid having to supply the pressure monitoring system with power continuously, in order to avoid excessively rapid consumption of the energy available in the battery. Research has therefore been carried out into various means of enabling the sensor not to operate continuously, but rather only when genuinely necessary. Thus, when the vehicle is stationary, there is no point in carrying out continuous measurements. One known solution to this problem consists in using a centrifuge switch, allowing disconnection of the sensor when the vehicle is at a standstill. Such a centrifuge switch, such as for example a spring-loaded ball, is currently used to detect the situation of the vehicle (whether it is moving or stationary). Any movement at a speed of the order for example of 3 to 5 km/h for several seconds allows re-actuation of the sensor. This type of switch has several limitations, however. In effect, a centrifuge switch is expensive, of limited durability and not very accurate, in that it is often necessary to travel 200 or 300 m or even more before the normal measurement mode is re-initiated. In such an instance, it is probable that a driver will be warned of under-inflation or even a puncture once he or she has left his/her parking place and is on the public highway. It is obviously highly desirable to prevent this type of situation.

The present invention allows this type of problem to be remedied. In order to do this, the invention proposes a tire pressure monitoring system, comprising:
- a pressure measuring sensor in fluid communication with the ambient pressure of the tire;
- a noise detector, adapted to detect the noise produced by the vehicle when it is started;
- a management module, adapted to receive and process data supplied by the pressure sensor on the one hand and on the other hand by the noise detector such that, when the vehicle is stopped, the pressure sensor operates in "economy" mode; when the vehicle is moving, the pressure sensor operates in "normal" mode.

Due to the noise detector, it is possible to suppress the centrifuge switch described above. A high-pass filter is preferably attached to the system in order to retain solely frequencies greater than 10 or 100 Hz, for example.

The noise detector is preferably of the piezoelectric type.

This is a technology which is in itself tried and tested, reliable, accurate and allows very short response times, such as for example of less than 100 ms. Moreover, one of the main characteristics of sensors of the piezoelectric type is that they are able to operate without a power supply. More particularly, deformation of the membrane consisting of a piezoelectric type material allows the generation of a micro-current. This current is then used by a circuit for reading and processing or analysing the signal. Only the electronic module requires a power supply, but a very weak one. A long-life battery may thus be provided.

The noise detector is advantageously also a pressure variation detector.

In addition to the functions associated with the detection of pressure variations, for example acting as a blow-out detector or controlling the iteration rate of a pressure measuring sensor, the pressure variation sensor of the piezoelectric type acts as a microphone which may easily detect with great accuracy a transfer into travelling mode. The detection of any abnormality is then effected very rapidly, and the driver may be informed thereof well before leaving the car park, or indeed even before entering into travelling mode, since even starting-up of the engine may be detected by the piezoelectric type detector, which allows the driver to respond before the vehicle has even moved. According to one advantageous embodiment of the invention, the electricity consumption of the piezoelectric type detector is substantially zero. In this way, the energy of the battery is saved.

In one advantageous example, the noise detector is sensitive to the noises produced by angular displacement of a wheel with which it is associated.

According to another advantageous example, the noise detector is sensitive to the noises produced by the engine of the vehicle.

"Economy" mode is preferably that in which the time interval between the measurements carried out by the pressure sensor is substantially longer than in "normal" mode.

In "economy" mode, it is possible to reduce the frequency with which tire pressure is measured. The monitoring system is then supplied with power only at time intervals such as every 2, 3, 5, 30, 60, 120 minutes etc. Once travelling is resumed, "normal" measurement mode is re-adopted.

According to one advantageous embodiment of the invention, when the operating mode changes from "economy" to "normal", there is provided a transitional period of operation in "accelerated" measurement mode, in which the time interval between the measurements effected by the pressure sensor is substantially shorter than in "normal" mode.

The tire pressure monitoring system comprises a transmission means allowing data to be forwarded from the wheel on which the sensor and the detector are advantageously arranged to the non-rotating portion of the vehicle. This transmission means preferably comprises one or more antennae.

The transmission means may be of the transponder type or indeed of the radio emitter/receiver type.

The pressure variation detector is advantageously adapted to act on another element cooperating either electrically or mechanically with said detector.

The time interval within which it is desirable for the device to respond corresponds advantageously to a very short time, such as for example a time interval within which the time t tends towards 0 seconds. The shorter the time, the more the device can contribute towards improving safety.

The signal transmitted by the management module is advantageously of the electrical or radio type.

For example, the noise and pressure variation detector comprises a casing provided with two chambers, insulated substantially from one another and separated by a piezoelectric type membrane, a first chamber being subject to a reference pressure and the second being adapted to be in fluid communication with the environment of the medium in which it is desired to effect monitoring, said membrane being deformable under the action of a variation in the pressure of said environment, the deformations thus produced allowing the generation of an electrical signal, the strength of which is related to the degree of deformation.

The reference pressure of the reference chamber is substantially constant and does not change at the time of a variation in the pressure of the environment being monitored, which allows the pressure differential between the chambers to change, this latter variation giving rise to the generation of a piezoelectric type signal.

Advantageously, the membrane is adapted to respond with an amplitude and/or a speed of deformation which is a function of the level and/or rate of pressure variation.

Advantageously, the reference pressure corresponds to a vacuum.

The sensor is advantageously disposed in such a way that the environment of the medium in which monitoring is performed corresponds to the pressure inside the tire cavity. For example, the sensor may be disposed directly in said cavity; on the other hand, pipes may allow the environment to be forwarded to the sensor disposed for example in the wheel.

The device according to the invention is advantageously provided for mounting on a wheel; it is then advantageous to provide at least one means of transmitting data to a non-rotating part of the vehicle, in order to ensure that the signals may pass from the wheel to the vehicle. The vehicle may exhibit at least one data receiving means.

The invention also provides a tire comprising a noise detector as described above.

The invention also provides a rim comprising a noise detector as described above.

Other characteristics and advantages of the invention will become apparent from a reading of the non-limiting description of the blow-out detection device according to the invention given with reference to the attached Figures, in which.

Figure 4:
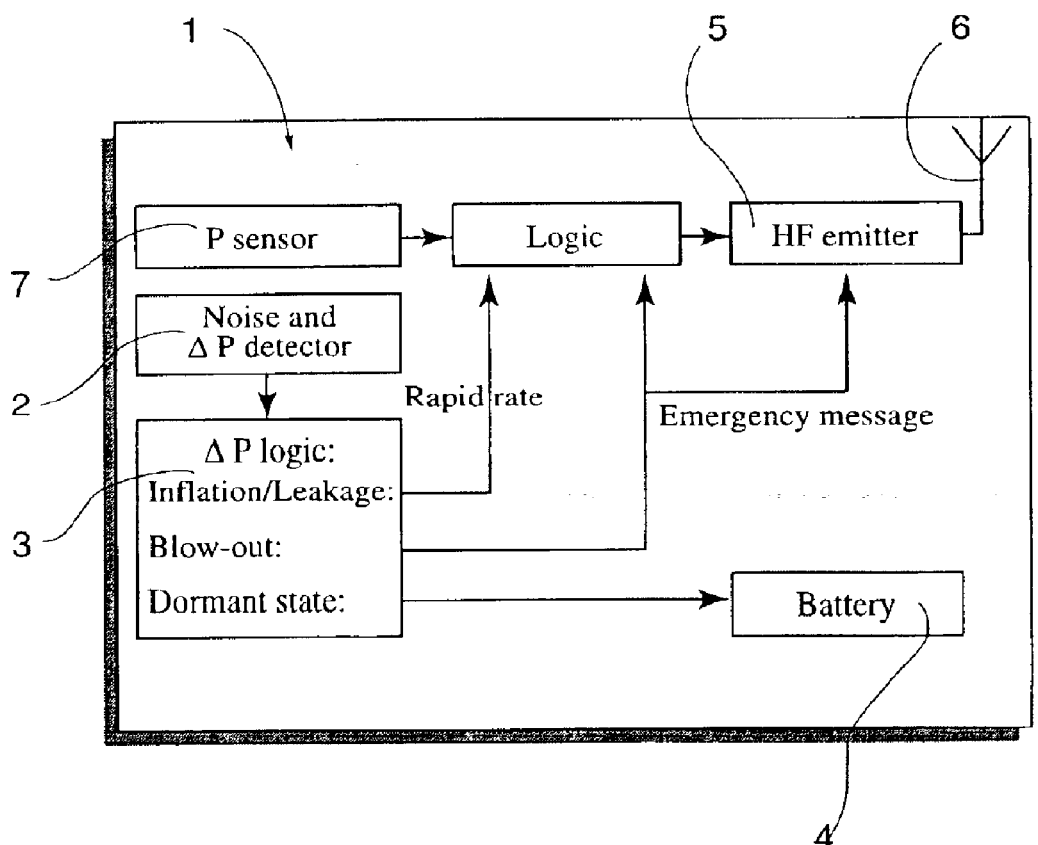
FIG. 4 illustrates a functional diagram of a system for measuring and/or monitoring the pressure of the tires of a vehicle, comprising a pressure sensor and a pressure variation detector.

FIG. 4 illustrates a functional diagram of a system for monitoring the pressure of a tire 1, according to the invention. It comprises a pressure sensor 7, a pressure variation sensor 2, as described below. A management module 3 cooperating electrically or mechanically with the sensor 2 is provided. A battery 4 allows power to be supplied to the module 3 and the sensor 7, and optionally to the sensor 2, but an advantageous type of sensor 2 according to the invention does not require any power supply, which allows savings to be made with regard to the battery 4. In order to permit the transmission of data from the vehicle wheel to the vehicle, a transmission module 5 is preferably and advantageously provided. This may for example comprise an emitter (preferably High Frequency), a transponder etc. An antenna 6 may optionally complete the device of FIG. 4.

This device is provided for mounting on a wheel, either on the rim or on the tire. It may also be incorporated into one or other of these elements, such as for example moulded in a wall of the tire. For this reason, a pressure variation detector 2 is preferably used which does not require a power supply, so as to allow the battery 4 to exhibit a service life which may as far as possible match that of the tire, the wheel or the vehicle. The battery 4 is then incorporated into the device 1; it may for example be welded. In this manner, the frequent contact problems inherent in replaceable batteries are avoided.

Figure 1:
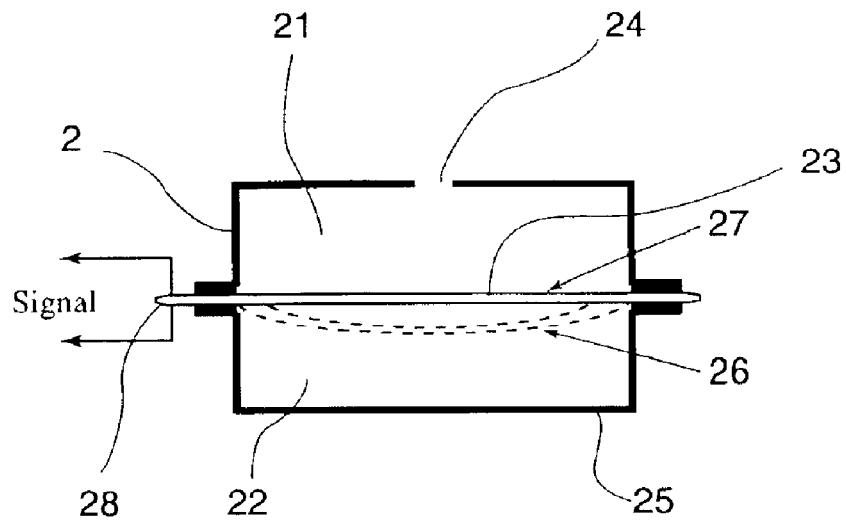
FIG. 1 is a schematic sectional view of a pressure variation sensor according to the invention.

FIG. 1 illustrates a particularly advantageous type of pressure variation detector 2, of the piezoelectric type. This comprises a casing 25, provided with two chambers 21 and 22, separated and substantially insulated from one another by a piezoelectric type membrane 23. An opening 24 allows a fluid communication to be established between a first chamber 21 of the detector and the medium or environment which it is wished to monitor. The chamber 22 is subject to a reference pressure, or is even pressure-less or under a vacuum. An electrical output 28 allows transmission of the weak current signal generated during any deformation of the membrane 23.

If the chamber 22 is under a vacuum, the membrane 23 generally displays concave deformation; it is pushed towards the chamber 22 under vacuum. All additional pressure stemming from the orifice 24 will contribute to deformation of the membrane 23, which will occupy a stabilized position such as for example 26. Any drop in pressure in the control chamber 21 entails fresh deformation of the membrane 23, which then tends to resume its original (substantially flat) shape or profile 27. In the event of a variation in the curvature of the membrane 23, a weak current is emitted, as a function of the amplitude and/or speed of deformation. Thus a blow-out in the tire connected to the chamber 21 by the orifice 24 entails a considerable sharp drop in the pressure in the chamber 21. Deformation of the membrane 23 from a first stabilized profile to a second stabilised profile allows generation of a current by the electrical output 28. This current may thereafter be received by a management module 3 and processed appropriately.

Figure 2:
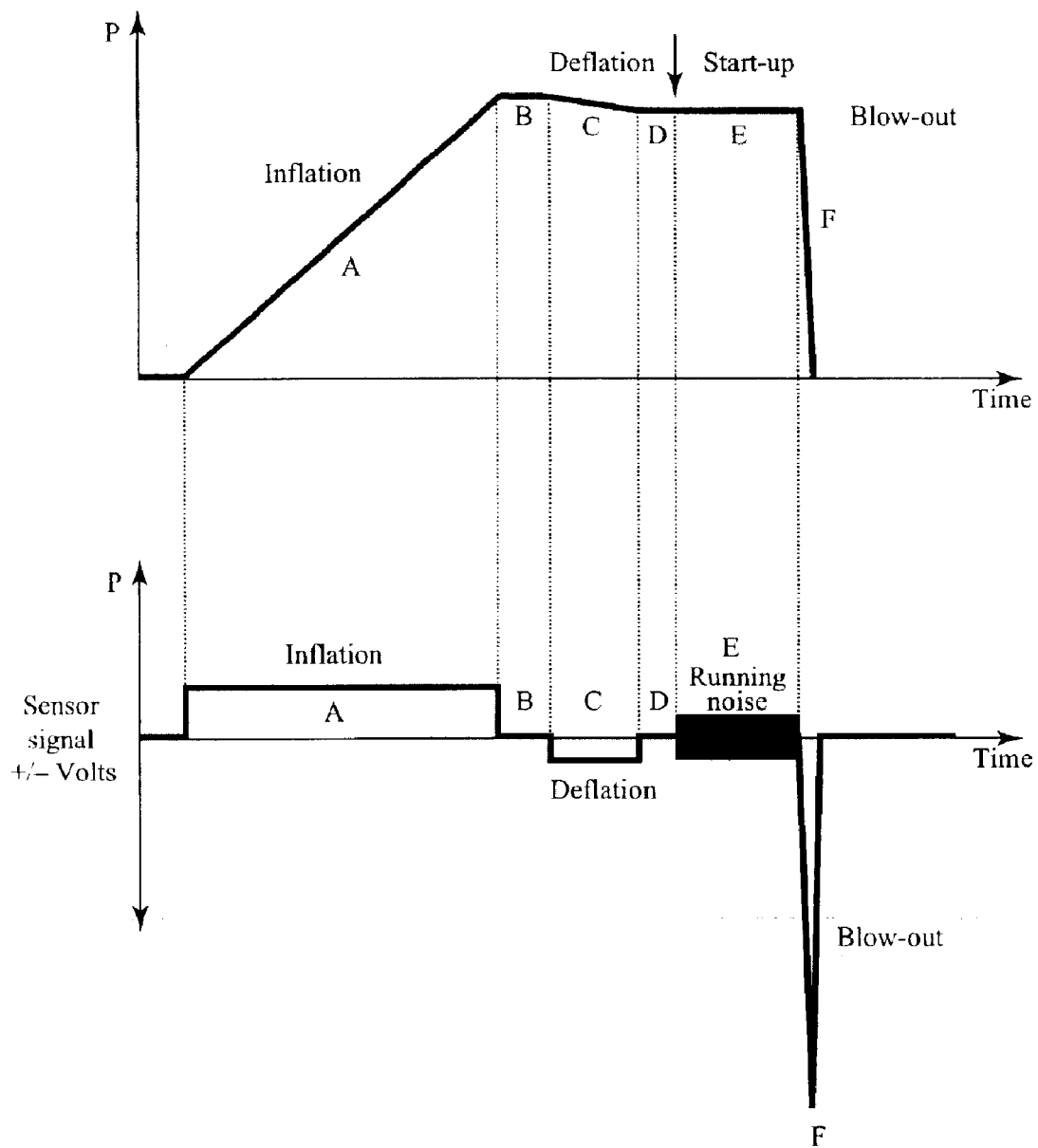
FIG. 2 shows a diagram illustrating examples of signals associated with certain types of pressure variation liable to occur in vehicle tires.

FIG. 2 illustrates examples of signals adapted to be generated by a pressure variation detector 2 according to the invention. The Figure shows the relationship between the physical phenomenon present and the corresponding signal of the detector. For example, in inflation mode A, the pressure increases, i.e., changes. This causes the generation of a signal which may for example be positive and constant and is associated with a slight, continuous and regular pressure variation.

At a constant pressure, at B and D, no signal is generated since the membrane remains fixed and does not change in profile.

In the event of a decrease in pressure, at C, a signal which may for example be negative and constant may be associated with a slight, constant and regular pressure reduction.

At F, the tire bursts or suffers very considerable and rapid loss of pressure, allowing the generation of a signal in the form of a "spike", of short duration, since the membrane of the sensor is severely deformed for a very short period, the period required to pass from a first substantially stabilized profile to another substantially stabilized profile.

At E, the pressure is stable and the vehicle moves. The running noise may be picked up by the sensor, depending on its sensitivity. It then operates as a noise detector or sensor or microphone. This dual function as pressure variation detector/running noise detector is particularly advantageous, as illustrated by FIG. 3.

Figure 3:
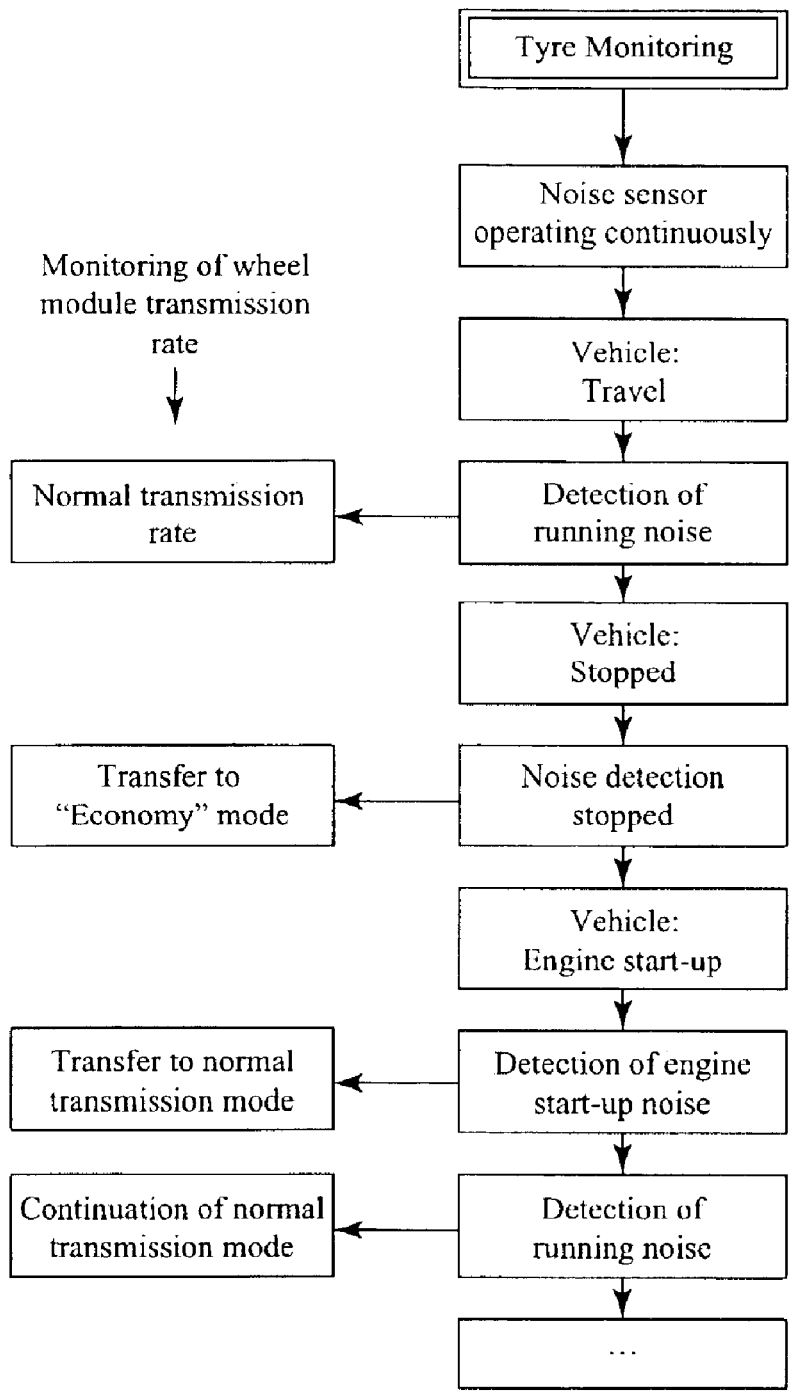
FIG. 3 shows a flowchart for monitoring a tire with a monitoring system according to the invention.

FIG. 3 shows a working diagram of the tire monitoring method, using a pressure monitoring system according to the invention. In normal functioning mode, the measurements made by the pressure sensor 7 are effected iteratively, at given time intervals.

In order to extend the service life of the battery to the maximum possible extent, it is desirable to reduce the number of iterations for a given period, as soon as it is no longer necessary to monitor the tires continuously, typically in the event of stoppage of the vehicle, in particular for a prolonged stop. To this end, the noise detector 2 monitors continuously the sound behaviour of the vehicle and preferably of one or more tires. In general, when the vehicle is stationary the sound level diminishes or becomes substantially zero. The noise detector allows this situation to be detected. The management module 3 may then initiate the "economy" mode, in which the time interval between the measurements effected is substantially longer than in normal mode. This type of operation in particular allows battery savings to be made. If the noise detector is so calibrated as to detect the operating noise of the engine, transfer to normal mode is effected before any travel. Thus, any problem associated with abnormal pressure is detected before the vehicle takes to the road. If the detector is so calibrated as solely to detect travel of the wheels, this may be detected as soon as the first angular displacements are made, so that any pressure problem may be revealed before the vehicle takes to the road or begins to travel at high speed.

Advantageously, when the operating mode changes from "economy" to "normal", there is provided a short transitional period of operation in "accelerated" measurement mode, which allows any abnormality in the pressure of one or more tires to be detected very rapidly, or indeed substantially instantaneously.

What is claimed is:

1. A battery-powered tire pressure monitoring system for use on a vehicle, comprising:

a pressure-measuring sensor arranged in fluid communication with a tire for periodically providing tire pressure measurements;

a management module operably connected to the pressure-measuring sensor for controlling the pressure-measuring sensor; and a noise detector for detecting noise produced by the vehicle, the noise detector being operably connected to the management module, wherein the pressure-measuring sensor is caused to switch from a normal operational mode to an economy operational mode when a detected noise level is below a predetermined value, to extend battery life.

2. The system according to claim 1 wherein the noise detector comprises a piezo-electric member.

3. The system according to claim 2 wherein the noise detector comprises a pressure variation sensor in which the piezo-electric member is in fluid communication with a tire.

4. The system according to claim 3 wherein the noise detector provides an indication of tire blow-out.

5. The system according to claim 1 wherein the noise sensor is sensitive to noises produced by a vehicle engine.

6. The system according to claim 1 wherein the noise detector is sensitive to noises produced by tire rotation.

7. The system according to claim 1 wherein the noise detector causes the measuring frequency pressure-measuring sensor to be switched out of economy operational mode in response to starting-up the vehicle engine.

8. The system according to claim 1 wherein the noise detector causes the pressure measuring sensor to be switched out of economy operational mode in response to movement of the vehicle from a stopped condition.

9. The system according to claim 1 wherein the management module control a tire pressure measuring frequency of the pressure measuring sensor, the tire pressure measuring frequency being reduced in the economy mode.

10. The system according to claim 9 wherein the management module is operable to switch the pressure-measuring sensor from the economy operational mode, sequentially to an accelerated operational mode, and to the normal operational mode, wherein the accelerated operational mode is at a higher frequency than the economy mode, and the normal operational mode is at a shorter tire pressure measuring frequency than the accelerated operational mode, the economy operational mode converting to the accelerated operational mode during a transition period when the measured noise exceeds a predetermined value.

* * * * *